United States Patent [19]
Kato

[11] Patent Number: 5,602,569
[45] Date of Patent: Feb. 11, 1997

[54] CONTROLLER FOR IMAGE PROCESSING APPARATUS

[75] Inventor: Shuhei Kato, Kyoto, Japan

[73] Assignee: Nintendo Co., Ltd., Kyoto, Japan

[21] Appl. No.: 427,036

[22] Filed: Apr. 24, 1995

[30] Foreign Application Priority Data

Apr. 28, 1994 [JP] Japan .................. 6-114683

[51] Int. Cl.⁶ .................................................. G09G 5/00
[52] U.S. Cl. .................. 345/158; 345/156; 345/157; 273/460; 74/471 R
[58] Field of Search .................. 345/158, 156, 345/157; 273/148 B, 460; 74/471 R, 471 XY

[56] References Cited

U.S. PATENT DOCUMENTS

| | | | |
|---|---|---|---|
| 4,748,441 | 3/1988 | Bizezinski | 340/709 |
| 4,839,838 | 6/1989 | LaBiche et al. | 364/709 |
| 5,059,958 | 10/1991 | Jacobs et al. | 340/706 |
| 5,068,645 | 11/1991 | Drumm | 340/710 |
| 5,329,276 | 7/1994 | Hirabayashi | 340/870 |
| 5,363,120 | 11/1994 | Drumm | 345/158 |
| 5,394,168 | 2/1995 | Smith et al. | 345/156 |
| 5,440,326 | 8/1995 | Quinn | 345/156 |
| 5,453,758 | 9/1995 | Sato | 345/158 |
| 5,477,237 | 12/1995 | Parks | 345/156 |
| 5,506,605 | 4/1996 | Paley | 345/163 |
| 5,528,265 | 6/1996 | Harrison | 345/158 |

FOREIGN PATENT DOCUMENTS 0085314   5/1985   Japan .................. G01D 5/12

*Primary Examiner*—Mark R. Powell
*Assistant Examiner*—Vincent E. Kovalick
*Attorney, Agent, or Firm*—Hoffmann & Baron

[57] ABSTRACT

A controller includes a housing in which a containing portion (102) which is provided with recess supporting portions (151) on its both inner side surfaces. A shaft (152) of a rotator (153) is off-centered and supported by the supporting portions (151) in a point-contact manner. A plurality of slits (155) are formed on the rotator (153) so as to form a concentric circle with the shaft (152) as a center. Two optical sensors (156, 157; 158, 159) detect the slits at positions different from each other. On the basis of outputs of the optical sensors (157, 159), a lean angle and a leaned direction of the housing which is leaned by an operator are detected. Therefore, an image generating apparatus changes image data so as to cause an image to change according to the lean angle and the leaned direction.

16 Claims, 8 Drawing Sheets

F I G.3
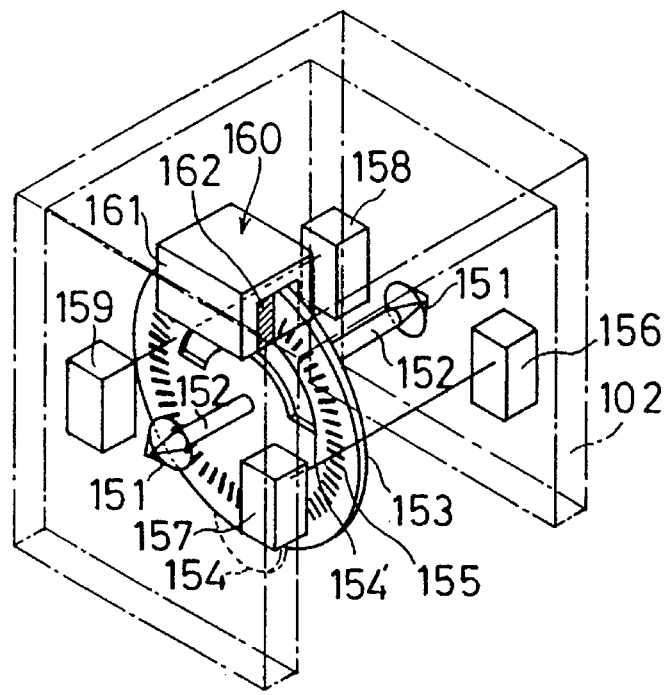
F I G.4
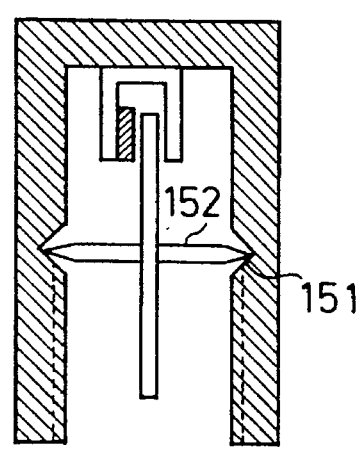

F I G.11
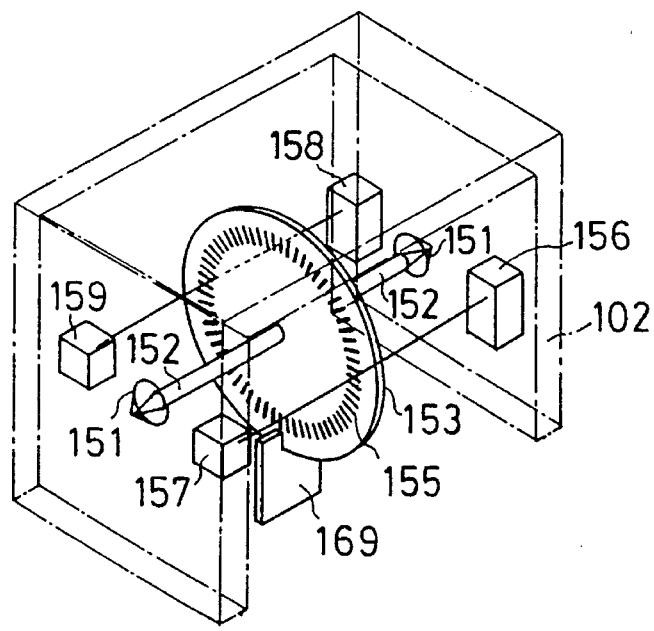
F I G.12
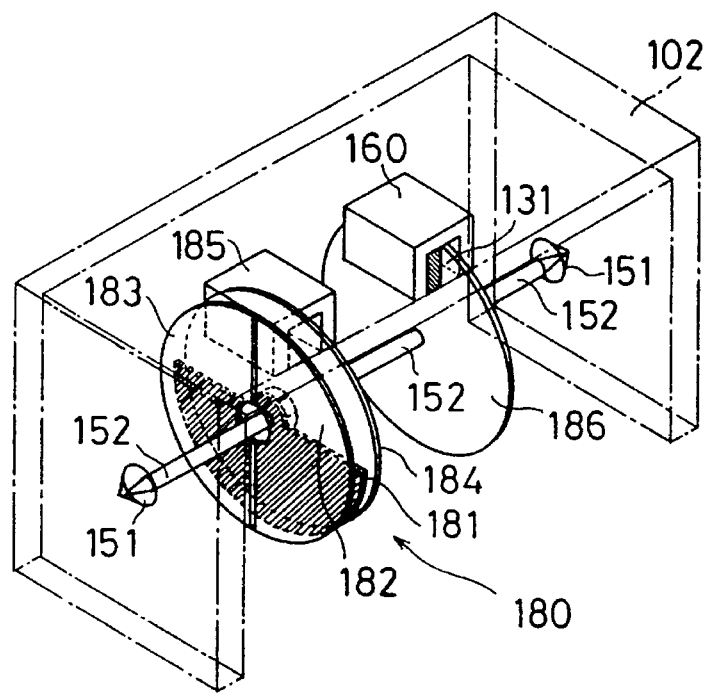

FIG. 14A
FIG. 14B
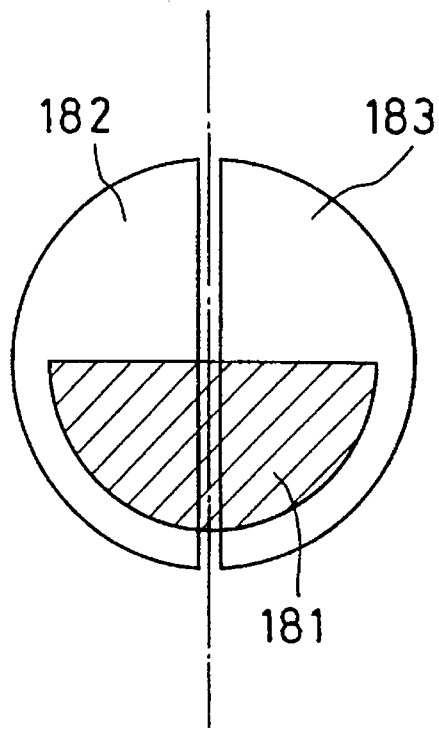
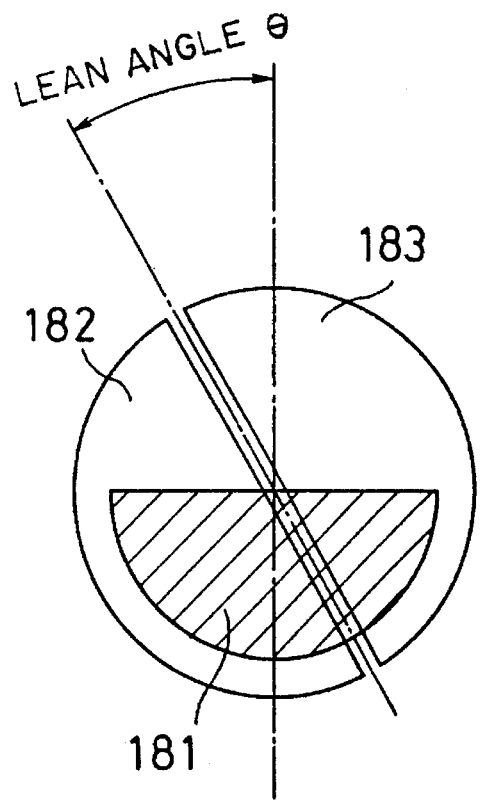

1

CONTROLLER FOR IMAGE PROCESSING APPARATUS

BACKGROUND OF THE INVENTION

1. Field of the Invention

The present invention relates to a controller for image processing apparatus. More specifically, the present invention relates to a controller which is utilized in an image processing apparatus such as a television game machine wherein it is required for an operator or player to continuously send quick and adequate reactions or responses to the television game machine while the operator or the player is watching a television screen, and outputs an electrical signal for controlling an image on the television screen according to a lean angle when an operating portion of the controller is leaned by hands of the operator or the player.

2. Description of the Prior Art

As a technique for a controller device which can be utilized for a television game machine and utilizes a lean or orientation of an operating portion, for example, a Japanese Patent Application Laying-open No. 58-112576 (corresponding to U.S. Pat. No. 4,503,299) for "Control-Lever for a Game" (hereinafter, called as "first prior art") is known. In the control-lever for game, a plurality of movable balls are contained in the operating portion, and when the operating portion is leaned, the balls roll toward a leaned direction, and therefore, switches provided on inner side walls of the operating portion are turned-on or -off, whereby presence or absence of the lean or orientation can be detected. Furthermore, the first prior art also discloses a technique in which mercury is used instead of the balls.

Other than the above described prior art, a technique in which the presence or absence of the lean as well as a degree of lean are somewhat considered as disclosed in "Freestanding Multidirectional Electrical Control Device" of U.S. Pat. No. 4,445,011 (hereinafter, called as "second prior art"). The second prior art utilizes mercury or electrical conductive liquid as similar to the first prior art, and the degree of lean is detected by combining contact electrodes made of material having an electrical resistance value which is changed in accordance with its length and the mercury or the electrical conductive liquid.

On the other hand, as an input device for moving a cursor on a screen of a computer video monitor, which is not for the television game machine, "Computer Input Device Using an Orientation Sensor" of U.S. Pat. No. 5,068,645 (hereinafter, called as "third prior art") is known. This device is one of a few prior arts that the device is mounted on a head of an operator such that an orientation angle of the head can be continuously detected, and used as a computer input device. The third prior art is an orientation angle detecting technique wherein a liquid is half-filled in a spherical housing, and a change of a transmission light which is outputted as a result of refraction at a boundary between the liquid and an air half-filled in an upper portion of the housing when the liquid is oriented is utilized.

The first prior art detects only whether the operating portion is leaned or not, and can not detect the lean angle. Furthermore, there is a problem in safety that the mercury is utilized for consumer products such as television game machines.

Furthermore, the second prior art utilizes the mercury or electrical conductive liquid as similar to the first prior art, and therefore, the second prior art can not be utilized for a purpose that a delicate movement of the operator is continuously detected within a wider angle range in view of utility, reliability, and operability.

The third prior art has a limit of detectable orientation angle of approximately ±30 degrees because of structural feature of the orientation angle detector, and therefore, the third prior art is limited to an input device which is mounted on the head of the operator. A use environment of the input device is also limited to a computer environment wherein the operator can use the input device quietly or gently because of a vibration of a surface of the liquid, responsivity and etc. If the third prior art is utilized in an environment for a television game machine wherein it is possible to presume that the operator or player moves lively, since the surface of the liquid waves, a reflection state of the light is undesirably changed, and accordingly, it is possible to consider that it is difficult to put the third prior art into practical use.

SUMMARY OF THE INVENTION

Therefore, an principal object of the present invention is to provide a novel controller for image processing apparatus.

Another object of the present invention is to provide a controller for image processing apparatus, capable of quickly and accurately following to a leaned or oriented state of an operating portion.

Another object of the present invention is to provided a controller for image processing apparatus, which is different from a device capable of responding only a time that a lean angle exceeds a predetermined angle, and even if the operating portion is delicately leaned, it is possible to respond thereto, and when the operating portion is stopped, the controller can be more quickly stabilized.

Another object of the present invention is to provide a controller for image processing apparatus, capable of making a range of a detectable lean angle wider, for example, more than ±90 degrees.

A further object of the present invention is to provide a controller for image processing apparatus, capable of setting a reference of lean of the operating portion by an operator or player independently from a direction of gravity.

Another object of the present invention is to provide a controller for image processing apparatus, by which a game can be played while the operator or player is sitting down on a sofa, for example, with a relaxed attitude.

A controller for image processing apparatus according to a first invention is utilized with being connected to an image generating apparatus which generates image data to be displayed on a display according to a program, and supplies a signal which determines a change of the image data generated by the image generating apparatus according to an operation by an operator or player, and comprises an operating portion, a bearing portion, a rotator with shaft, a lean angle detecting means, and a transfer means.

The operating portion is formed in a shape capable of being grasped or held by hands of the operator or player, and constructed such that the operating portion can take an arbitrary attitude according to an operation state by the operator or player. The bearing portion is fixed to a containing portion of the operating portion. The rotator with shaft is supported with rotation free by the bearing portion. Furthermore, the rotator with shaft has an eccentric center of gravity. The lean angle detecting means is fixedly supported by the operating portion, and detects a lean angle of the operating portion with respect to an eccentric direction of the rotator with shaft and the lean angle detecting means is in non-contact with the rotator with shaft. The transfer means transfers a numeral value detected by the lean angle detecting means to the image generating apparatus.

A controller for game machine according to a second invention is also utilized with being connected to an image generating apparatus which generates image data to be displayed on a display according to a program, and supplies a signal which determines a change of the image data generated by the image generating apparatus according to an operation by an operator or player, and comprises an operating portion, a bearing portion, a rotator with shaft, a lean angle detecting means, and a transfer means.

The operating portion is formed in a shape capable of being grasped or held by hands of the operator or player, and constructed such that the operating portion can take an arbitrary attitude according to an operation state by the operator or player. The bearing portion is fixed to a containing portion of the operating portion. The rotator with shaft is supported with rotation free by the bearing portion, and the rotator with shaft is supported in a manner that a supported portion becomes a low-friction state such that a maximum static friction force can be ignored in practical use. Furthermore, the rotator with shaft has an eccentric center of gravity. The lean angle detecting means is fixedly supported by the operating portion, and detects a lean angle of the operating portion with respect to an eccentric direction of the rotator with shaft in non-contact with the rotator with shaft. The transfer means transfers a numeral value detected by the lean angle detecting means to the image generating apparatus.

In the first invention, if the operator or player holds the operating portion with his hands and leans the operating portion, the lean angle detecting means is rotated according to the lean, and therefore, the lean angle detecting means generates an electrical signal according to the lean angle of the operating portion with respect to the rotator. The numeral value of the electrical signal is transferred to the image generating apparatus by the transfer means. In response thereto, the image generating apparatus generates an image signal for displaying an image to be changed in accordance with the value.

In the second invention, if the operator or player holds the operating portion with his hands and leans the operating portion, the lean angle detecting means is rotated according to the lean; however, since the shaft of the rotator is supported by the bearing portion with the low-friction state where the maximum static friction force can be ignored in practical use, the lean angle detecting means can quickly respond to the lean of the operating portion, and generates an electric signal according to the lean angle of the operating portion with respect to the rotator with shaft. The numeral value of the electrical signal is transferred to the image generating apparatus by the transfer means. In response thereto, the image generating apparatus generates an image signal for displaying an image to be changed in accordance with the value.

In accordance with the first invention, not only the lean direction but also the lean angle can be detected with high accuracy within a wider angle range, and therefore, it is possible to obtain a controller for image processing apparatus having good responsivity with respect to the operation by the operator or player.

In accordance with the second invention, since the shaft is supported such that the static friction resistance can be reduced at a degree that the same can be ignored in practical use, the controller can respond to a delicate movement of the operating portion being operated by the operator or player, and therefore, the controller can follow to the change of the lean of the operating portion with high responsivity, and accordingly, the lean of the operating portion can be detected with high accuracy.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a perspective view showing a lean angle detector contained in the controller;

FIG. 4 is a cross-sectional view showing the lean angle detector shown in FIG. 3;

FIG. 11 is an illustrative view showing a modified example of the braking means utilizing an air resistance;

FIG. 12 is a perspective view showing another example of the angle detector;

FIG. 14A and 14B are is an illustrative views showing a pair of electrodes and a rotation state of a semicircle rotator, and a detection principle of the lean angle.

DETAILED DESCRIPTION OF THE PREFERRED EMBODIMENTS

Figure 1:
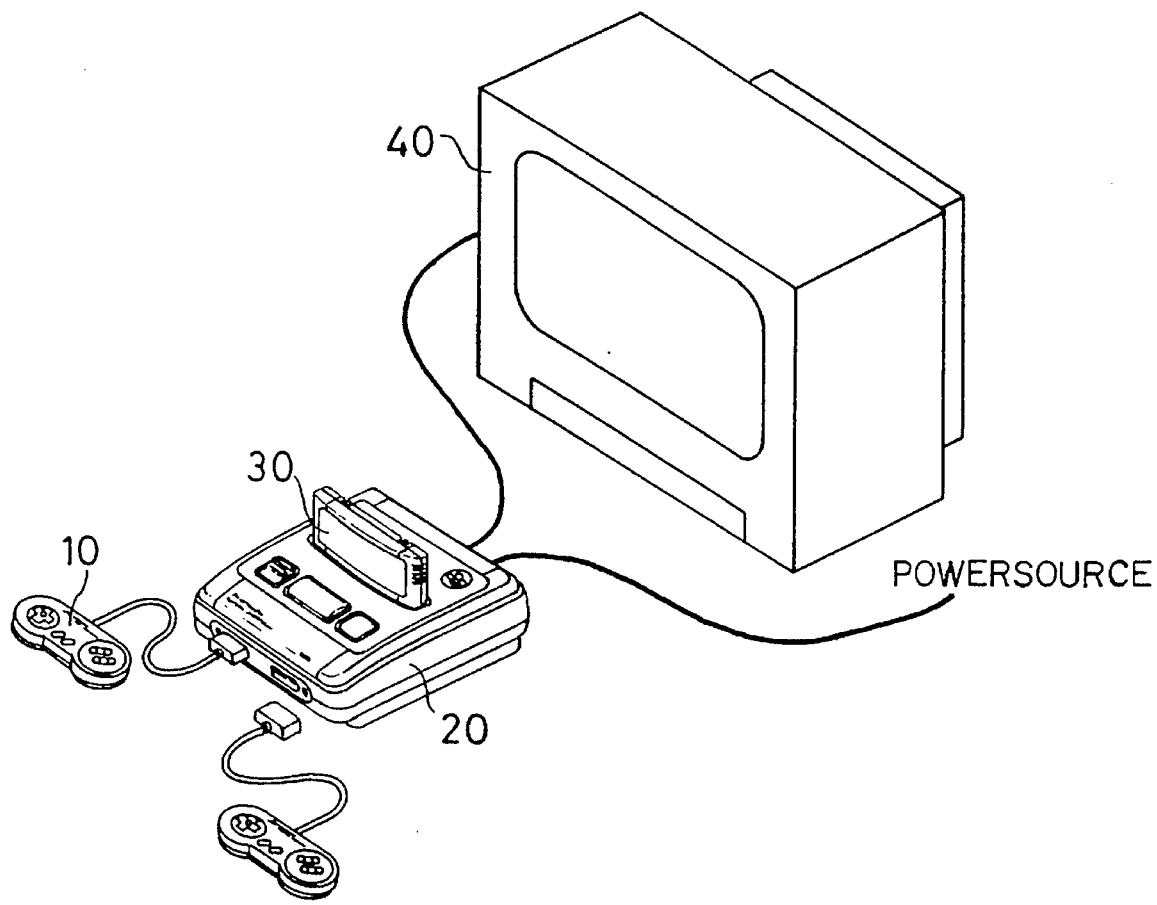
FIG. 1 is an illustrative view showing a using state of a controller for image processing apparatus of one embodiment according to the present invention.

FIG. 1 is an illustrative view showing a using state of a controller for image processing apparatus of one embodiment according to the present invention. The controller for image generating apparatus (hereinafter, simply called as "controller") 10 is used with being connected to an image generating apparatus 20 such as a television game machine. To the image generating apparatus 20, a cartridge 30 which stores a program and data for processing an image is detachably connected. The image generating apparatus 20 generates an image signal for displaying an image according to the program and the data from the cartridge 30, and data indicative of an operation state of the controller 10, and then, the image signal is supplied to a display 40 such as a television receiver.

Figure 2:
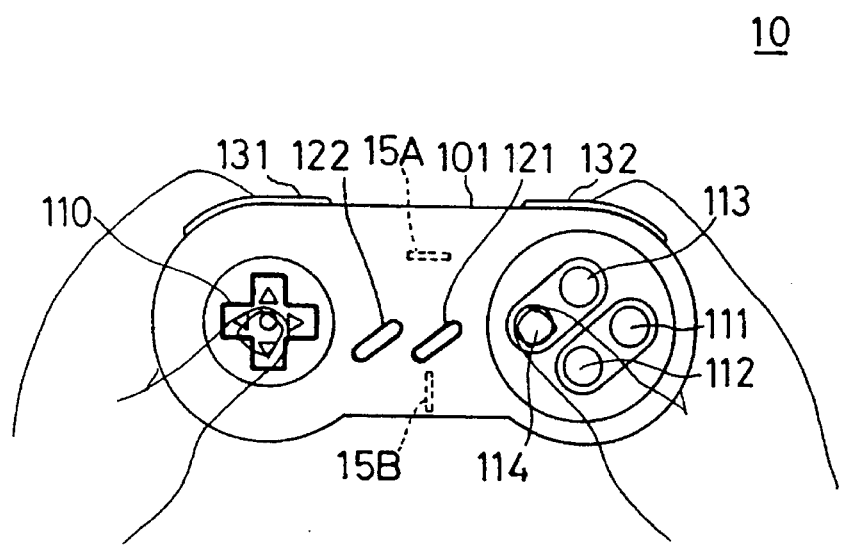
FIG. 2 is an appearance view showing the controller according to the embodiment.

FIG. 2 is an appearance view showing the controller. The controller 10 includes a housing 101 which is one example of an operating portion. The operating portion or housing 101 has, as similar to an operating portion of a controller which can be utilized for a television game machine manufactured and sold by the same assignee as the present invention, for example, "Family Computer (trademark)", a flat shape long from side to side, which can be held or grasped by both hands at right and left sides, and a various kinds of switches (described later) which can be operated by the operator or player with his thumbs or index fingers of the both hands.

More specifically, the operating portion 101 is provided with on its upper surface a direction designation switch 110 for designating moving directions (four directions of upper, lower, right and left) of a game character, action buttons 111–114 for designating various kinds of actions (jumping, punching, taking an item, attacking an enemy, or the like) of the character, that is, an A button 111, B button 112, X button 113 and Y button 114, a start button 121, and a select button 122. Furthermore, the operating portion 101 is provided on its upper side surface an L button 131 and an R button 132 for designating another actions as necessary.

FIG. 3 and FIG. 4 are structural views showing a lean angle detector included in the controller according to the present invention, wherein FIG. 3 is a perspective view, and FIG. 4 is a cross-sectional view with omitting a part. The lean angle detector (hereinafter, simply called as "angle detector") 15 is contained or housed in a containing portion 102 which is fixed to an inside of the operating portion 101. The containing portion 102 is formed in a U-letter shape (a shape of letter of "ko" in Japanese Katakana) with utilizing material difficult to be worn away, and includes a pair of supporting portions 151 on both side walls opposite to each other. More specifically, the pair of supporting portions 151 each of which has an engaging recess portion or a recess of cone shape (or a bearing portion) are formed on inner surfaces of the side walls of the containing portion 102. A rotator 153 fixed to a shaft 152 is supported by the supporting portions 151 with rotation free. The rotator 153 is provided with a weight portion 154 for making a given portion of the rotator heavier than other portions thereof so as to make the rotator to have an eccentric center of gravity.

Instead of the weight portion 154, a belt-like notch portion 154' may be formed at a portion along circumference of circle.

Preferably, in order to make a contacting area between the shaft 152 and the supporting portions 151 small as possible, each of both ends of the shaft 152 has a shape of cone so that the both ends of the shaft 152 can be supported by the supporting portions 151 in a point-contact manner. Therefore, since the shaft 152 is brought into point-contact with each of the supporting portions 151, a maximum static friction force can be reduced by a degree that the same can be ignored in practical use, and therefore, there is an advantage that a detection sensitivity and a responsivity can be increased.

In addition, modified examples of the rotator 153 and/or the angle detector 15 will be described later.

In order to detect the rotation angle of the rotator 153 with a high resolution power, the angle detector 15 is constructed in a manner described in the following. More specifically, a plurality of slits 155, which are examples of identifying portions, are formed with predetermined angle intervals on a concentric circle having a center at the shaft 152. If the number of the slits 155 is 64 (sixty-four), and the slits are formed with equal angle intervals, a unit angle becomes 5.625 degrees. At positions of the both side walls of the containing portion 102 sandwiching a predetermined position of the concentric circle on which the slits 155 are formed, in order to detect the rotation angle of the rotator 153, a light emitting portion (LED, for example) 156 and a light receiving portion (or a light detecting portion, for example, photo-transistor) 157 are provided with facing to each other. Such a pair of portions 156 and 157 is one example of a lean angle detection means. Furthermore, in order to detect a rotation direction of the rotator 153 in cooperation with the light emitting portion 156 and the light receiving portion 157, at other positions on the side walls of the containing portion 102, a further pair of a light emitting portion 158 and a light receiving portion 159 are provided, in a manner that if the rotator 153 is stopped in a state where a center of a given slit 155 is corresponding to a light axis between the light emitting portion 156 and the light receiving portion 157, an edge of the given slit 155 is positioned at a light axis between the light emitting portion 158 and and the light receiving portion 159. This pair of portions 158 and 159 is also one example of the lean angle detection means. Therefore, output waveforms of a first optical sensor composed of the light emitting portion 156 and the light receiving portion 157 and a second optical sensor composed of the light emitting portion 158 and the light receiving portion 159 become to have a phase difference of 90 degrees, and accordingly, it becomes possible to detect a forward rotation direction or a backward rotation direction in accordance with which one optical sensor generates a pulse.

In addition, in a case where an optical sensor (a type in which a reflection light is detected) is utilized, in order to detect the reflection light, the identifying portions including white and black bar symbols which are alternately arranged may be formed instead of the slits. Furthermore, it is also possible to detect the rotation angle of the rotator 153 by providing magnetic units at portions of the slits 155 of the rotator 153 and by detecting the same by means of magnet sensor such as a Hall element.

In the above described embodiment, since the supporting structure of the shaft 152 of the rotator 153 is the point-contact structure which can largely reduce the friction, at a time that the controller 10 is stopped after the controller 10 is leaned toward a given direction, the rotator 153 generates a vibration by which the rotator 153 converges to the lean angle at which the controller 10 is stopped.

Therefore, more preferably, as shown in FIG. 3, the containing portion 102 is provided with a damper 160 which is one example of a braking means for braking the rotator 153 at a position above the rotator 153. More specifically, the rotator 153 is made of an electrical conductive material such as aluminum, and the damper 160 includes a yoke 161 which is formed in a U-letter shape (in shape of letter "ko" in Japanese Katakana) which sandwiches a portion of the rotator 153 at both sides and is made of a ferromagnetic material such as iron. A magnet 162 is fixed at a portion of the yoke 161 facing to the rotator 153. Then, if the rotator 153 is rotated, the rotator 153 traverses a magnetic line of force of the magnet 162, and therefore, an eddy current occurs on the rotator 153, and accordingly, a force which rotates the rotator 153 is suppressed. The eddy current increases in proportion to a magnitude of an angle speed of the rotation of the rotator 153, and therefore, even if the rotator 153 vibrates due to a force other than the gravity such as a shock or a centrifugal force in a case where the controller 10 is suddenly leaned by the operator or player, the eddy current prevents the rotator 153 from continuously vibrating, and therefore, it becomes possible to detect the lean angle quickly.

Figure 5:
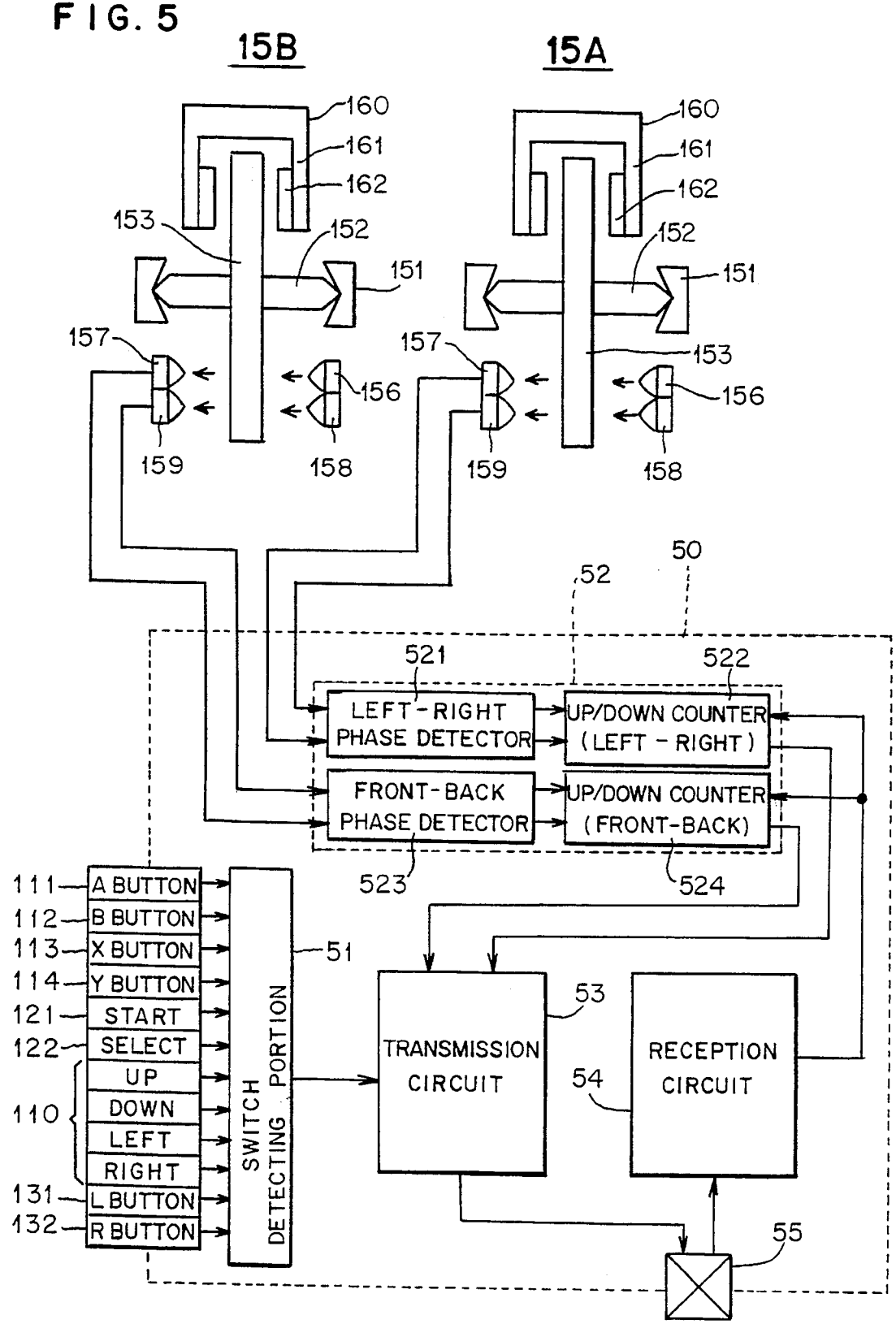
FIG. 5 is a block diagram showing a detection principle of the controller according to the embodiment.

In addition, if it is required to detect leans of the controller 10 in two directions of a front and back direction (up and down in FIG. 2) and a left and right direction in view from the operator or player, the above described angle detector 15 may be provided for each of the directions, and such two angle detectors are used as a left-right lean angle detector 15A and a front-back lean angle detector 15B shown in FIG. 5.

The two lean angle detectors (hereinafter, simply called as "angle detectors") 15A and 15B are contained in the housing 101 in a manner that respective shafts 152 intersect orthogonally with each other. In such a case, preferably, the angle detector 15A is arranged at the center of the left-right direction, and the angle detector 15B is arranged in front of a center of the front-back direction, as shown in FIG. 2. The reason for this arrangement is that, in a case where the controller 10 is leaned or oriented in the left-right direction, a center of rotation of the controller 10 becomes the center of the left-right direction of the controller 10. In contrast, in a case where the controller 10 is leaned or oriented in the front-back direction, the operator moves the controller 10 with his wrists as the center in vibrating or rotating the controller 10 in the front-back direction, and therefore, the center of the rotation of the controller 10 becomes a center point of rotation of the wrists of the operator or player. Accordingly, the centrifugal force acts on the controller 10 from the center of the lean angle toward outside due to the rotation in the front-back direction, and therefore, unnecessary vibration of the rotator becomes large. Then, the angle detector 15B is arranged at a front side of the center of the front-back direction such that the center of the front-back direction can be as close to the center of rotation as possible.

Furthermore, within the housing or operating portion 101, an input/output control circuit 50 shown in FIG. 5 is contained. In the following, a detection principle of a case where the leans in two directions intersecting approximately orthogonally are to be detected will be described.

FIG. 5 is a block diagram showing a detection principle of an operation of the controller, i.e. the lean angle and the leaned direction according to the embodiment. The input/output control circuit 50 contained in the controller 10 includes a switch detecting portion 51 for detecting a depressed state of each of the switches 110–114, 121, 122, 131 and 132, a conversion circuit 52, a transmission circuit 53, a reception circuit 54, and an input/output circuit 55.

The conversion circuit 52 includes a left-right phase detector 521 for detecting a leaned or oriented direction of the rotator 153 included in the angle detector 15A, an up/down counter 522, a front-back phase detector 523 for detecting a leaned or oriented direction of the rotator 153 included in the angle detector 15B, and an up/down counter 524.

Detection signals of the light receiving portions 157 and 159 of the angle detector 15A are inputted to the left-right phase detector 521, and to the front-back phase detector 523, and detection signals of the light receiving portions 157 and 159 of the angle detector 15B are inputted to the detectors 521 and 523. On the basis of the detection signals and a phase signal from the left-right phase detector 521 or the front-back phase detector 523, the up/down counter 522 or 524 performs an addition operation at a time that the rotator 153 is rotated or leaned forward, and a subtraction operation at a time that the rotator 153 is rotated or leaned backward.

In addition, the conversion circuit 52 may be omitted. In such a case, output pulses of the angle detectors 15A and 15B and the switches 110–132 are transferred directly or with being modulated from the transmission circuit 53 to the image generating apparatus 20, and numeral value data equal to the lean angles may be calculated through the program processing at the end of the image generating apparatus 20. In this case, the image generating apparatus 20 may have the lean angle detection means.

Next, an operation of a case where an image display is changed with utilizing the controller 10 will be described. At first, the operator grasps or holds the left and right portions of the controller 10 with palms of the both hands, and operates the action switches 111–114 by a right thumb and the direction designation switch 110 by a left thumb. Furthermore, the operator or player designates the lean of the left-right direction by moving the both hands up and down, or designates the lean of the front-back direction by rotating the both wrists up and down. In addition, the operator or player can simultaneously designate a complex detections of the leans, i.e. the left-right direction and the front-back direction.

Prior to starting the game, when the operator or player depresses the start switch 121, its detection signal is applied to the image generating apparatus 20 via the transmission circuit 53 and the input/output circuit 55. In response thereto, the image generating apparatus 20 generates an initial reset signal and applies the same to the up/down counters 522 and 524 via the input/output circuit 55, thereby to reset the counters 522 and 524.

Then, in a case where the operator or player designates the lean in the left-right direction, e.g. a case where turning a car image displayed in a driving game rightward is to be designated, by moving the right-hand upward and the left-hand downward, the rotation of the right direction is designated. That is, the housing or operating portion 101 is rotated or leaned rightward with respect to the rotator 153 in a state where the rotator 153 of the angle detector 15A is oriented toward the gravity direction, and accordingly, the light receiving portions 157 and 159 generate pulses sequentially. In response thereto, the left-right phase detector 521 generates a phase signal indicative of the right rotation (forward rotation) on the basis of the generation order of the pulses from the light receiving portions 157 and 159 of the angle detector 15A, and applies the pulses from the light receiving portions 157 and 159 to the up/down counter 522 as an addition command signal. Therefore, the up/down counter 522 performs the addition operation for each of the input pulses so as to count a count value in proportion to the lean angle of the housing or operating portion 101. More specifically, since two kinds of pulses having different phases are inputted from the light receiving portions 157 and 159 to the up/down counter 522, and then, the up/down counter 522 counts at both of a leading edge and a trailing edge of each of the pulses, if the housing or operating portion 101 is rotated by N times the unit angle of the slits 155, the count value becomes 4N. Therefore, a minimum detection angle has accuracy of 4 (four) times the unit angle of the slit 155.

In contrast, if the housing or operating portion 101 is rotated toward the left direction by moving the left-hand down and the right-hand up by the operator or player, the left-right phase detector 521 generates a phase signal indicative of the left rotation (backward rotation), i.e. a subtraction command signal, on the basis of the generation order of the pulses from the light receiving portions 157 and 159 of the angle detector 15A, and the pulses from the light receiving portions 157 and 159 are applied to the up/down counter 522. In response thereto, the up/down counter 522 performs the subtraction operation for each input pulse to count a count value in proportion to the lean angle of the housing 101. Therefore, in a case where after the housing 101 is rotated rightward, and the same is rotated leftward by the same angle, that is, in a case where the housing 101 is returned to its original state, the count value of the up/down counter 522 returns to zero.

On the other hand, in a case where the operator or player designates the lean in the front-back direction, e.g. in a case where the raising of an airplane image displayed in an airplane game is to be commanded in controlling the airplane image, the housing or operating portion 101 is rotated upward by bending the left and right hands with the wrists as fulcrums. Then, the housing or operating portion 101 is rotated or leaned in the right direction with respect to the rotator 153 in view from the left side of the housing 101 in a state where the rotator 153 of the angle detector 15B is oriented to the gravity direction, and therefore, the light receiving portions 157 and 159 of the angle detector 15B sequentially generate pulses. Accordingly, the left-right phase detector 523 generates a phase signal (an addition command signal) indicative of the right rotation (forward rotation) on the basis of the generation order of the pulses from the light receiving portions 157 and 159, and applies the pulses from the light receiving portions 157 and 159 to the up/down counter 524. In response thereto, the up/down counter 524 performs the addition operation for each of the input pulse to count a count value in proportion to the lean angle of the housing or operation portion 101.

In contrast, if the operator or player rotates the housing or operation portion 101 in the left direction in view from the left side by bending the both hands downward with wrists as fulcrums, the front-back phase detector 523 generates a phase signal (a subtraction command signal) indicative of the left rotation (backward rotation) on the basis of the generation order of the pulses from the light receiving portions 157 and 159 of the angle detector 15B, and applies the pulses from the light receiving portions 157 and 159 to the up/down counter 524. In response thereto, the up/down counter 524 performs the subtraction operation for each input pulse to count a count value in proportion to the lean angle of the housing or operating portion 101.

As described above, the count value equal to the angle according to the leaned state of the housing or operating portion 101 in the left-right and/or front-back directions are counted by the up/down counter 522 and/or the up/down counter 524. At the same time, the signals indicating depressed states of the switches 110–114, 121, 122, 131 and 132 are detected by the switch detecting portion 51. For example, if the switch is depressed, "1" is detected, and if the switch is not depressed, "0" is detected. Then, a read instruction is applied to the reception circuit 54 at every timing of a predetermined time period (e.g. 1/60 seconds equal to one frame period of the display 40) from the image generating apparatus 20 to the reception circuit 54 via the input/output circuit 55. In response thereto, the reception circuit 54 applies a read command signal to the transmission circuit 53, and therefore, the transmission circuit 53 converts codes representative of operation states of the switches 110–114, 121, 122, 131 and 132 and respective count values (digital values) of the up/down counters 522 and 524 into data having a predetermined format, and then, sends the data to the image generating apparatus 20. Accordingly, signals representative of an operation state of the controller 10 is supplied to the image generating apparatus 20. The image generating apparatus 20 determines the operation state of the controller 10 on the basis of the signals representative of the operation state of the controller 10, and the program and the data stored in a memory contained in the cartridge 30, and then, generates image data so as to display the image on the display 40.

In addition, in a case where the dampers 160 are provided in the angle detectors 15A and 15B, even if the operator or player moves the housing or operating portion 101 hard, the vibration each of the rotators 153 due to the shock or the centrifugal force is prevented, and therefore, each of the rotators 153 is braked, and accordingly, the vibration of each of the rotators 153 is attenuated. Therefore, it is possible to detect the rotation angle or the lean angle of the housing or operation portion 101 more quickly, and therefore, a delay due to the vibration can be reduced.

Figure 6:
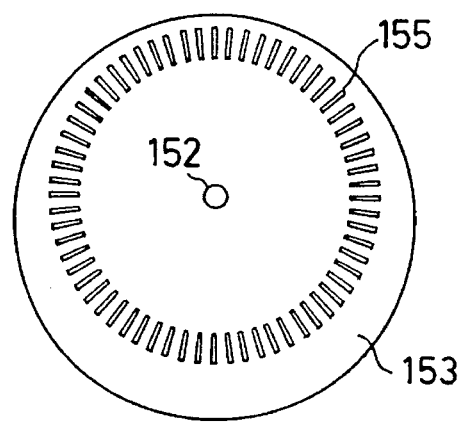
FIG. 6 is an illustrative view showing another example of a rotator.

FIG. 6 is an illustrative view showing another example of the rotator. A rotator 153' shown in FIG. 6 has the shaft 152 which is formed at a position being eccentric from a geometrical center of the rotator 153', whereby a predetermined portion of the rotator 153' is oriented to the gravity direction, and the slits 155 are formed on a concentric circle with the shaft 152 as a center.

Figure 7:
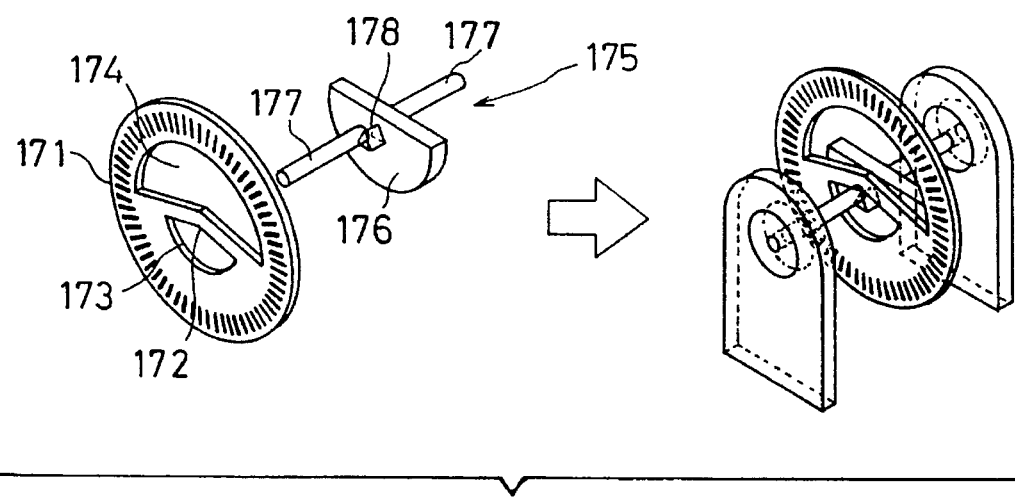
FIG. 7 is an illustrative view showing another example of a supporting portion.

FIG. 7 is an illustrative view showing another example of the bearing portion. A rotator 171 shown in FIG. 7 includes a disc plate having a center at a geometrical center axis 172, and the disc plate is formed with a notch portion 173 having a fan-shape or sector with the center axis 172 as a vertex, and a notch portion 174 having an area wider than an area of the notch portion 173 at opposite position, and the center axis 172 is engaged by a supporting shaft 175 so that the rotator 171 is supported.

More specifically, the supporting shaft 175 is formed with a shaft 177 (corresponding to the shaft 152) at both sides of a pendulum 176 of a semicircle, and an engaging projection 178 having a triangle shape formed at a base end of one shaft 177 which engages with the rotator 171. The pendulum 176 may not be oriented to a true gravity direction due to a friction; however, the rotator 171 can be oriented to the true gravity direction because a friction between a fulcrum 172 and supporting portion 178 is small due to a line-contact therebetween. Furthermore, although relative positional relationship between the fulcrum 172 and the supporting portion 178 is almost never changed, the shaft 177 and the supporting portion 178 are rotated 360 degrees, and therefore, even if the controller 10 takes any leaned state, the same portion is oriented to the gravity direction.

Figure 8:
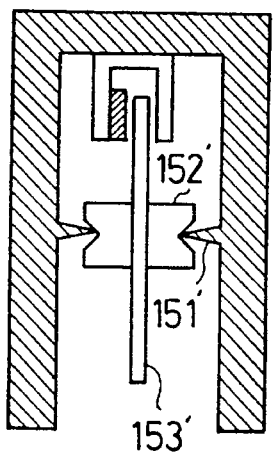
FIG. 8 is a cross-sectional view showing a modified example of the supporting portion.

FIG. 8 is an illustrative view showing a modified example of the bearing portion. In the embodiment shown in FIG. 3 and FIG. 4, the both ends of the shaft 152 are pointed as cone shapes, and the supporting portions 151 are the recesses each having V-letter shape in crosssection; however, in this embodiment shown, a relationship between a projected portion and a recessed portion is made inverse.

More specifically, an angle detector 15' includes a shaft 152' with both ends each having a recess portion of a V-letter shape in cross-section (a recess of a cone shape), and supporting portions 151 each having a projection of a cone shape, and the shaft 152' is supported by the projections in a point-contact manner. In such a case, since the shaft 152' and the supporting portions 151' are brought into point-contact with each other, a static friction between the both becomes small at a degree that the same can be ignored in practical use. Therefore, the rotator 153' can be rotated with small friction, and therefore, a responsivity can be increased. Furthermore, in the embodiment shown, the rotator may not have a precision projected portion, and therefore, it is possible to easily manufacture the rotator.

Figure 9:
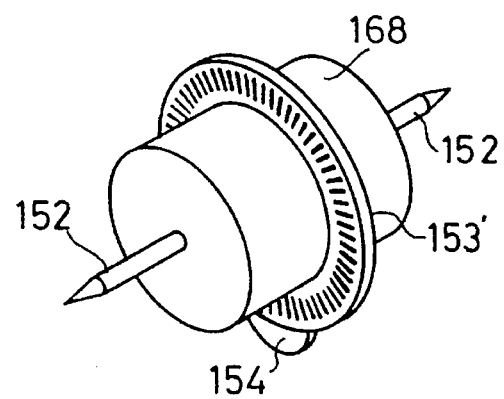
FIG. 9 is a perspective view showing a modified example of a braking means utilizing a liquid.
Figure 10:
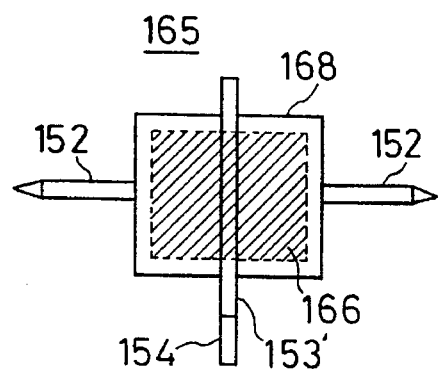
FIG. 10 is a cross-sectional view of the braking means of FIG. 9.

FIG. 9 and FIG. 10 are illustrative views showing a modified example of the braking means (damper) utilizing a liquid, and especially, FIG. 9 is a perspective view and FIG. 10 is a cross-sectional view. A damper 185 of this embodiment shown is provided with a cylinder 168 which is filled by a liquid 166, and shafts 152 which are formed on both side surfaces of the cylinder 188 in a state where the cylinder 168 is brought down horizontally, and a ring-like rotator 153' formed on an outer peripheral surface of the cylinder 168. Then, if the controller 10 is leaned, the rotator 153' is rotated by the gravity, shock and centrifugal force; however, the liquid 166 does not move due to an inertia. At this time, a viscous resistance or friction between the liquid 166 and an inner peripheral surface of the cylinder 168 functions to prevent a vibration of the rotator 153', and therefore, the vibration can be reduced. Accordingly, it becomes possible to detect the lean angle quickly. Furthermore, in an arrangement of the cylinder 168 and the rotator 153', by extending a shaft from a side surface of the cylinder 168 and by fixing the rotator 153' to the shaft 152, the cylinder 168 and the rotator 153' may be supported on the same axis.

The braking means utilizing the liquid may be constructed as another embodiment as follows: The containing portion 102 (FIG. 3) is formed as closed structure by covering three surfaces of the angle detector 15 being opened by other wall surfaces, and the rotator 153 is supported within the containing portion 102 with rotation free, and the liquid is charged surround the rotator 153 such that the containing portion 102 is filled by the liquid. In such a case, the liquid directly applies a braking force to the rotator 153.

Furthermore, another example of the braking means is shown in FIG. 11. This FIG. 11 embodiment is similar to FIG. 3 embodiment except that a plate 169 is attached to a point on the outer peripheral surface of the rotator 153 in a manner that main surfaces of the plate orthogonally intersect the rotation direction of the rotator 153. When the rotator 153 is rotated, the plate 169 generates an air resistance so as to brake the rotation of the rotator 153. In addition, the plate 169 also functions as the weight for orienting the rotator 153 to the gravity direction.

In addition, in the above described embodiments, in a case where the shaft 152 is supported by the supporting portion 151 in a point-contact manner, and a mechanical braking means is described; however, it may be considered that an angle detection result similar to that of the mechanical braking means is obtained through a program processing. For example, in a case where no mechanical braking force is applied, the rotator 153 is vibrated forward and backward directions within a small angle range, and therefore, the count values of the up/down counters 522 and 524 vary up and down by small values with a center of rough values equal to the rotation or lean angle of the housing or operating portion 101. Then, center values at a time that the count values of the up/down counters 522 and 524 vary up and down by the small value may be evaluated by an arithmetic operation.

FIG. 12 is an illustrative view showing another example of the angle detector. In the embodiment shown in FIG. 3, a technique for detecting the rotation angle of the controller 101 in a digital manner is described; however, the rotation angle also can be detected in an analog manner as shown in FIG. 12.

More specifically, an angle detector 15' shown in FIG. 12 includes an air-variable capacitor 180 instead of the slits 155 and the optical sensors shown in FIG. 3. The air-variable capacitor 180 is constructed such that a shaft 152 is fixed to a semicircle rotator 181 corresponding to the rotator 153, and the shaft 152 is supported by the supporting portions 151 with rotation free, and a pair of semicircle electrodes 182 and 183 each of which includes the semicircle rotator through which the shaft 152 is penetrated are faced to a disc-like electrode 184, and the electrodes 182, 183 and 184 are fixed to the supporting portions 151 via fixing members (not shown). In addition, the pair of semicircle electrodes 182 and 183 are obtained by dividing a donut-like plate into two portions, and each of the semicircle electrodes 182 and 183 is fixed in a manner that a diameter of the semicircle, i.e. a chord of the semicircle is along the gravity direction in a normal state.

In the example shown in FIG. 12, by utilizing a fact that an electrostatic capacitance between the electrodes 182 and 183 and the electrode 184 is changed in accordance with a relative angle of the pair of electrodes 182 and 183 with respect to the semicircle rotator 181, the rotation angle corresponding to the lean angle is detected.

Furthermore, in order to obtain a braking force by an eddy current, a braking disc 185 made of a non-magnetic and electric conductive material such as aluminum is fixed to one side of the shaft 152. The aforementioned damper 160 is fixed to the containing portion 102 above the braking disc 185. A braking operation by the damper 160 is the same as that of FIG. 3.

Figure 13:
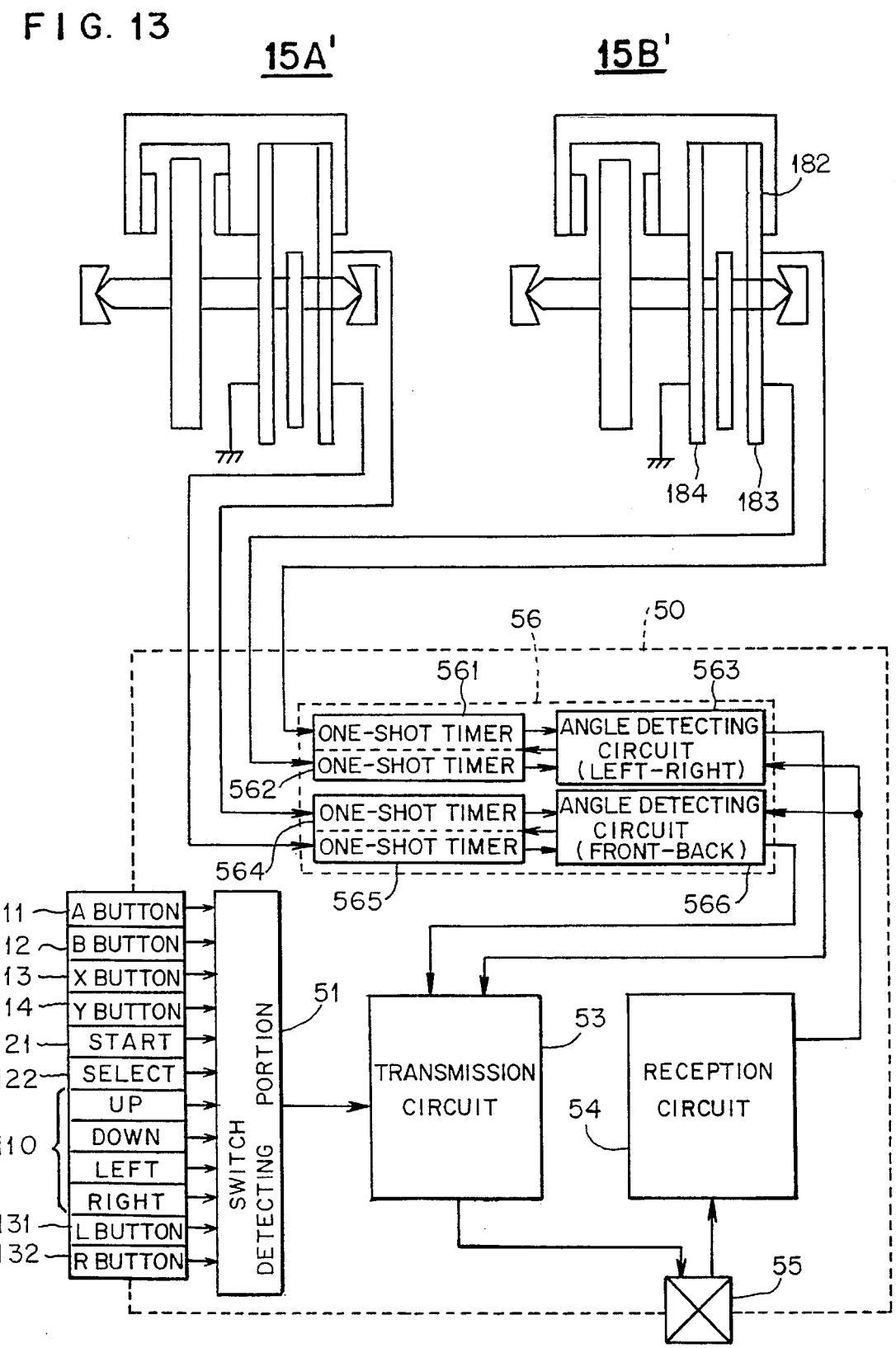
FIG. 13 is a block diagram showing a detection principle of a controller according to FIG. 12.

FIG. 13 is a block diagram showing a detection principle of the lean angle and the leaned direction, i.e. an operation of a controller according to FIG. 12 embodiment. In this embodiment shown, in order to detect the lean angle in an analog manner, the controller 10 utilizes the air-variable capacitor 180 shown in FIG. 12. Then, in order to make the electrostatic capacitance (an analog amount) equal to a change of the rotation or lean angle into a count value of a digital amount, a conversion circuit 56 is provided in an input/output circuit 50.

The conversion circuit 56 includes one-shot timers 561 and 562 which respectively receive the electrostatic capacitance values of the electrodes 182 and 183 of the angle detector 15A', an angle detecting circuit 588 which includes counters each counts a pulse which is outputted from each of the one-shot timers 561 and 562 and has a width in proportion to an amplitude of the electrostatic capacitance value, one-shot timers 564 and 565 which respectively receive the electrostatic capacitance values of the electrodes 182 and 183 of the angle detector 15B' and an angle detecting circuit 563 which includes counters each of which counts a pulse which is outputted from each of the one-shot timers 564 and 565 and has a width in proportion to a magnitude of each of the electrostatic capacitance values. Other portions of the input/output control circuit 50 are the same or similar to that of FIG. 5 embodiment, and therefore, description of that portions will be omitted.

In an operation of FIG. 13 embodiment, the chord of the semicircle rotator 181 is oriented to the horizontal direction, and a center of an arc, i.e. a position of 90 degrees is directed to the gravity direction. At a time that the operator or player holds the controller 10 in a horizontal state, respective chords of the electrodes 182 and 183 of respective angle detectors 15A' and 15B' are stopped in a state that the chords are along the gravity direction as shown in FIG. 14. In this state, an area of the semicircle rotator 181 positioned between the electrodes 182 and 184 and an area of the semicircle rotator 181 positioned between the electrodes 183 and 184 are approximately equal to each other, and therefore, the electrostatic capacitance values (C1 and C2) withdrawn from the electrodes 182 and 183 of the angle detectors 15A' and 15B' becomes equal to each other (C1=C2). Therefore, output signals having the same pulse width are applied to the angle detecting circuit 563 from the one-shot timers 561 and 562. Likewise, output signals having the same pulse width are applied to the angle detecting circuit 566 from the one-shot timers 564 and 565. Therefore, the both angle detecting circuits 563 and 566 evaluate digital values indicating that the controller 10 is not leaned in any directions, and output the same.

On the other hand, at a time that the operator or player rotates or leans the controller 10 in any direction, e.g. at a time that the controller 10 is rotated in the left direction in view from the operator by bringing the left downward and the right upward, the housing or operating portion 101 is rotated in the left direction in view from the operator; however, the center of the arc of the semicircle rotator 181 is maintained to be oriented to the gravity direction while the chords of the electrodes 182 and 183 of the angle detector 15A are rotated with respect to the gravity direction by a lean angle θ as same as the rotation angle of the controller 10 as shown in FIG. 14. At this time, the angle detector 15B is stopped at a state where the chords of the electrodes 182 and 183 are oriented to the gravity direction. In such a state, an area of the semicircle rotator 181 facing to the electrode 182 of the angle detector 15A and an area of the semicircle rotator 181 facing to the electrode 183 are changed in accordance with the lean angle θ. Therefore, the electrostatic capacitance (C1) withdrawn from the electrode 182 becomes larger than the electrostatic capacitance C2 withdrawn from the electrode 183 (C1>C2), and therefore, a difference between the electrostatic capacitance values becomes to have a relationship to the lean angle θ. Accordingly, output pulse width (L1) of the one-shot timer 561 becomes longer than the output pulse width (L2) of the one-shot timer 562, and therefore, a difference of the both pulse widths (L1–L2) becomes to have a width correlative to the lean angle θ. The angle detecting circuit 563 evaluates the count value in proportion to the pulse width by counting the clock during respective pulse widths in response to the pulse widths (L1, L2), and thereafter, evaluates the count value equal to the difference of the pulse widths (L1–L2), thereby to evaluate a digital value (or count value) correlative to the lean angle θ, and further evaluates a leaned direction (in the above described embodiment, the left direction) by detecting which one count value larger than another.

In addition, if the rotation direction of the controller 10 is the right direction, the lean angle θ can be also evaluated by the count value of the difference of the pulse widths, but a relationship between the pulse widths becomes inverse, and therefore, it is possible to detect that the leaned direction is the right direction. Furthermore, in a case where the rotation direction of the controller 10 is the front-back direction, through a similar operation, the change of the electrostatic capacitance value associated with the rotation angle or lean angle is detected by the angle detector 15B', and the one-shot timers 564 and 565 and the angle detecting circuit 566 detects the lean angle θ and the leaned direction. Thus, digital values indicative of the count values of the lean angle in the left-right and the front-back directions detected by the angle detecting circuits 563 and 566, and the leaned direction are transferred to the image generating apparatus 20 in a manner similar to that of FIG. 5 embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A controller utilized with being connected to an image processing apparatus which generates image data to be displayed on a display on the basis of a program, and for supplying a signal which determines a change of the image data generated by the image processing apparatus through an operation by an operator, comprising:

an operating portion which takes an arbitrary attitude according to an operation by the operator;

a bearing portion fixed to said operating portion;

a rotator having a shaft which is supported by said bearing portion with rotation free and has an eccentric center of gravity;

a lean angle detection means which detects a lean angle of the operating portion with respect to an eccentric direction of said rotator in non-contact with the rotator, and outputs data corresponding to the lean angle; and a transfer means which transfers the data outputted by the lean angle detection means to said image processing apparatus.

2. A controller according to claim 1, wherein said lean angle detection means includes an analog detection means which generates an analog amount according to said lean angle.

3. A controller according to claim 1, wherein said lean angle detection means includes a digital detection means which generates digital data according to the lean angle.

4. A controller according to claim 3, wherein said rotator includes a plurality of angle identifying portions formed along a rotation direction of the rotator in a manner that the rotation angle with respect to the eccentric direction can be identified, and said lean angle detection means includes a first pulse generating means which generates a first pulse equal to the number of said angle identifying portions in accordance with said lean angle, a second pulse generating means which generates a second pulse having a deviated phase from the first pulse generated by said first pulse generating means, a rotation direction determining means which determines said rotator is rotated in any direction of a forward direction and a backward direction on the basis of the first pulse and the second pulse from said first pulse generating means and said second pulse generating means, and a numeral data generating means which counts one of the first pulse and the second pulse from said first pulse generating means and said second pulse generating means on the basis of the rotation direction determined by said rotation direction determining means, and outputs numeral value data equal to the lean angle.

5. A controller according to claim 4, wherein said angle identifying portions are formed in a circumferential direction with said shaft as a center in an optically detectable manner, and said first pulse generating means and said second pulse generating means each including an optical pulse generating means which includes a light emitting portion and a light receiving portion, and outputting pulses at a time that a light from the light emitting portion is detected by the light receiving portion via said angle identifying portions.

6. A controller according to claim 1, wherein said rotator is arranged in a manner that a center axis of the rotation of said rotator and a center axis of the rotation of said operating portion when said operating portion is rotated by the operator can be as close to each other as possible.

7. A controller according to claim 1, wherein said bearing portion includes a first bearing portion and a second bearing portion, and said rotator includes a first rotator supported by said first bearing portion with rotation free and a second rotator supported by said second bearing portion with rotation free, and said lean angle detection means includes a first detection signal generating means which detects a first lean angle of said operating portion with respect to said first rotator, and a second lean angle detection means which detects a second lean angle of said operating portion with respect to said second rotator, and said transfer means transfers data corresponding to the first lean angle detected by said first lean angle detection means and data corresponding to the second lean angle detected by said second lean angle detection means.

8. A controller according to claim 7, wherein said first rotator is utilized for detecting a lean amount of a first direction that is a left-right direction in view from the operator, and said second rotator is utilized for detecting a lean amount of a second direction, that is, a front-back direction in view of the operator.

9. A controller utilized with being connected to an image processing apparatus which generates image data to be displayed on a display on the basis of a program, and for supplying a signal which determines a change of the image data generated by the image processing apparatus through an operation by an operator, comprising:

an operating portion which takes an arbitrary attitude according to an operation by the operator;

a bearing portion fixed to said operating portion;

a rotator having a shaft which is supported by said bearing portion with rotation free in a manner that a maximum friction resistance can be ignored in practical use and has an eccentric center of gravity;

a lean angle detection means which detects a lean angle of the operating portion with respect to an eccentric direction of said rotator, the lean angle detection means being in non-contact with said rotator and outputting data corresponding to the angle; and a transfer means which transfers the data outputted by the lean angle detection means to said image processing apparatus.

10. A controller according to claim 9, wherein one of an end portion of the shaft of said rotator and said bearing portion includes a projection portion, and the other includes a recess portion capable of being brought into point-contact with the projection portion.

11. A controller according to claim 9, further comprising a braking means which is provided in association with said rotator, and applies a braking force in association with an angle speed of said rotator to said rotator to prevent said rotator from being vibrated due to an inertia.

12. A controller according to claim 11, wherein said braking means includes a magnetic braking means which includes a portion facing to said rotator, and the inertia of said rotator is suppressed by a magnetic force of that portion.

13. A controller according to claim 9, wherein said braking means includes a liquid braking means which includes a liquid enclosing portion for enclosing a liquid, and a liquid enclosed by said liquid enclosing portion so as to be brought into contact with said rotator, and said rotator is prevented from being vibrated with respect to said operating portion with utilizing a viscous resistance according to a change of a relative position between the said rotator and said liquid.

14. A controller according to claim 9, wherein said rotator is arranged in a manner that a center axis of the rotation of said rotator and a center axis of the rotation of said operating portion when said operating portion is rotated by the operator can be as close to each other as possible.

15. A controller according to claim 9, wherein said bearing portion includes a first bearing portion and a second bearing portion, and said rotator includes a first rotator supported by said first bearing portion with rotation free and a second rotator supported by said second bearing portion with rotation free, and said lean angle detection means includes a first detection signal generating means which detects a first lean angle of said operating portion with respect to said first rotator, and a second lean angle detection means which detects a second lean angle of said operating portion with respect to said second rotator, and said transfer means transferring data corresponding to the first lean angle detected by said first lean angle detection means and data corresponding to the second lean angle detected by said second lean angle detection means.

16. A controller according to claim 15, wherein said first rotator is utilized for detecting a lean amount of a first direction that is a left-right direction in view from the operator, and said second rotator is utilized for detecting a lean amount of a second direction, that is, a front-back direction in view of the operator.

* * * * *